US007926106B1

(12) United States Patent
Kennedy et al.

(10) Patent No.: US 7,926,106 B1
(45) Date of Patent: Apr. 12, 2011

(54) UTILIZING EARLY EXCLUSIVE VOLUME ACCESS AND DIRECT VOLUME MANIPULATION TO REMOVE PROTECTED FILES

(75) Inventors: Mark Kennedy, Redondo Beach, CA (US); Michael Spertus, Chicago, IL (US); Peter Linhardt, Malibu, CA (US); Richard Gough, Torrance, CA (US); Adam Glick, Culver City, CA (US); Patrick Gardner, Northridge, CA (US); Spencer Smith, Sherman Oaks, CA (US); Tim Naftel, Longmont, CO (US)

(73) Assignee: Symantec Corporation, Mountain View, CA (US)

( * ) Notice: Subject to any disclaimer, the term of this patent is extended or adjusted under 35 U.S.C. 154(b) by 1072 days.

(21) Appl. No.: 11/400,538

(22) Filed: Apr. 6, 2006

(51) Int. Cl.
*G06F 11/00* (2006.01)

(52) U.S. Cl. ............... 726/22; 726/23; 726/24; 726/25; 726/27; 713/1; 713/2; 713/165; 713/166; 713/167

(58) Field of Classification Search .................. 713/1–3, 713/165–167; 726/22–27
See application file for complete search history.

(56) References Cited

U.S. PATENT DOCUMENTS

| 2004/0083383 | A1* | 4/2004 | Carmona ................. 713/200 |
| 2005/0268079 | A1* | 12/2005 | Rothman et al. ........... 713/1 |
| 2007/0067844 | A1* | 3/2007 | Williamson et al. ....... 726/24 |
| 2007/0079373 | A1* | 4/2007 | Gassoway ................. 726/22 |
| 2007/0180529 | A1* | 8/2007 | Costea et al. ............. 726/24 |

OTHER PUBLICATIONS

Russinovich, M., "*Inside Native Applications*", pp. 1-3, 1998. [online]. Retrieved on Mar. 3, 2006. Retrieved from the Internet:<URL:http://www.sysinternals.com/Information/NativeApplications.html>.

\* cited by examiner

*Primary Examiner* — Kambiz Zand
*Assistant Examiner* — Tongoc Tran
(74) *Attorney, Agent, or Firm* — Gunnison, McKay & Hodgson, L.L.P.; Forrest Gunnison

(57) ABSTRACT

Upon detection of a rootkit, a host computer system is rebooted. The boot process is interrupted. Access to a media, e.g., a volume or disk, containing the rootkit is gained and the media is directly accessed. The rootkit is disabled, e.g., renamed or deleted, and the host computer system is rebooted a second time. If the rootkit has not been previously removed, e.g., only renamed, the rootkit is removed, e.g., using a conventional antivirus application. Thus, upon detection of a rootkit, the rootkit is removed without a clean boot.

16 Claims, 3 Drawing Sheets

UTILIZING EARLY EXCLUSIVE VOLUME ACCESS AND DIRECT VOLUME MANIPULATION TO REMOVE PROTECTED FILES

BACKGROUND

1. Field of the Invention

The present invention relates to computer system security. More particularly, the present invention relates to a system and method of removing malicious code from a computer system.

2. Description of the Related Art

Increasingly various forms of malicious code, such as spyware and computer viruses, protect their presence on computer systems using a variety of stealth and persistence techniques. These techniques actively prevent detection and removal of the malicious code from a running system.

To remove the malicious code, a clean boot is typically required. Unfortunately, there are many complications associated with a clean boot. The host computer system's BIOS must be configured properly and the clean boot media, e.g., a floppy disk, CD or DVD, must be available and used.

SUMMARY OF THE INVENTION

In accordance with one embodiment of the present invention, upon detection of a rootkit, the host computer system is rebooted. The boot process is interrupted. Access to a media, e.g., a volume or disk, containing the rootkit is gained and the media is directly accessed. The rootkit is disabled, e.g., renamed or deleted, and the host computer system is rebooted a second time. If the rootkit has not been previously removed, e.g., only renamed, the rootkit is removed, e.g., using a conventional antivirus application.

Thus, upon detection of a rootkit, the rootkit is removed without a clean boot, i.e., without use of a separate clean boot media such as a floppy disk, CD, DVD, or other media. Further, the rootkit is removed without reconfiguration of the BIOS of the host computer system.

Embodiments are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 3:
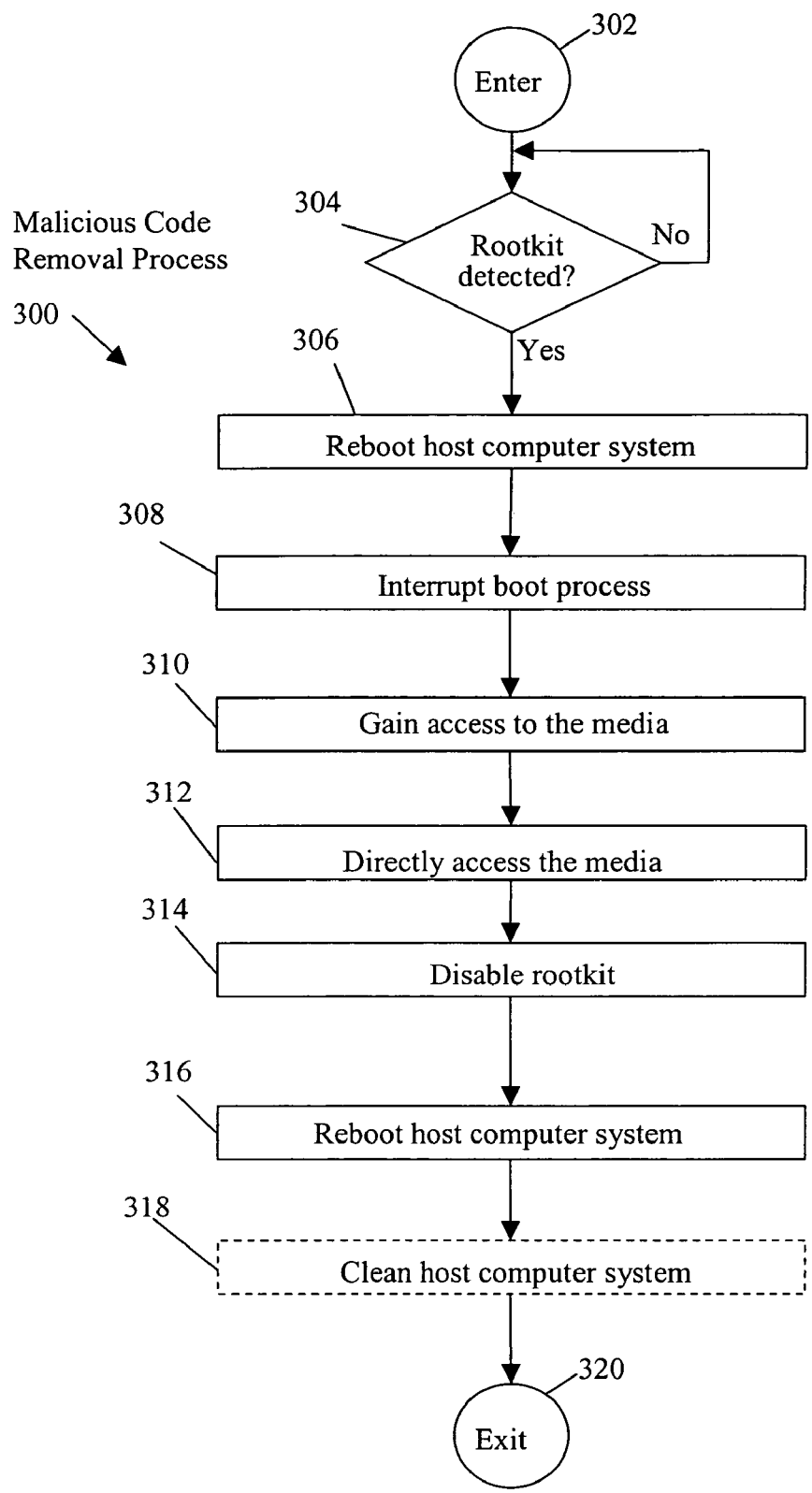
FIG. 3 is a flow diagram of a malicious code removal process for removing malicious code such as a rootkit in accordance with one embodiment of the present invention.

In accordance with one embodiment, referring to FIG. 3, upon detection of a rootkit in a ROOTKIT DETECTED CHECK OPERATION 304, the host computer system is rebooted in a REBOOT HOST COMPUTER SYSTEM OPERATION 306. The boot process is interrupted in an INTERRUPT BOOT PROCESS OPERATION 308. Access to the media, e.g., volume or disk, containing the rootkit is gained in a GAIN ACCESS TO THE MEDIA OPERATION 310 and the media is directly accessed in a DIRECTLY ACCESS THE MEDIA OPERATION 312. In a DISABLE ROOTKIT OPERATION 314, the rootkit is disabled, e.g., renamed or deleted, and the host computer system is rebooted a second time in a REBOOT HOST COMPUTER SYSTEM OPERATION 316. If the rootkit has not been previously removed, e.g., only renamed, the rootkit is removed in a CLEAN HOST COMPUTER SYSTEM OPERATION 318, e.g., using a conventional antivirus application.

Thus, upon detection of a rootkit, the rootkit is removed without a clean boot, i.e., without use of a separate clean boot media such as a floppy disk, CD, DVD, or other media. Further, the rootkit is removed without reconfiguration of the BIOS of the host computer system.

Figure 1:
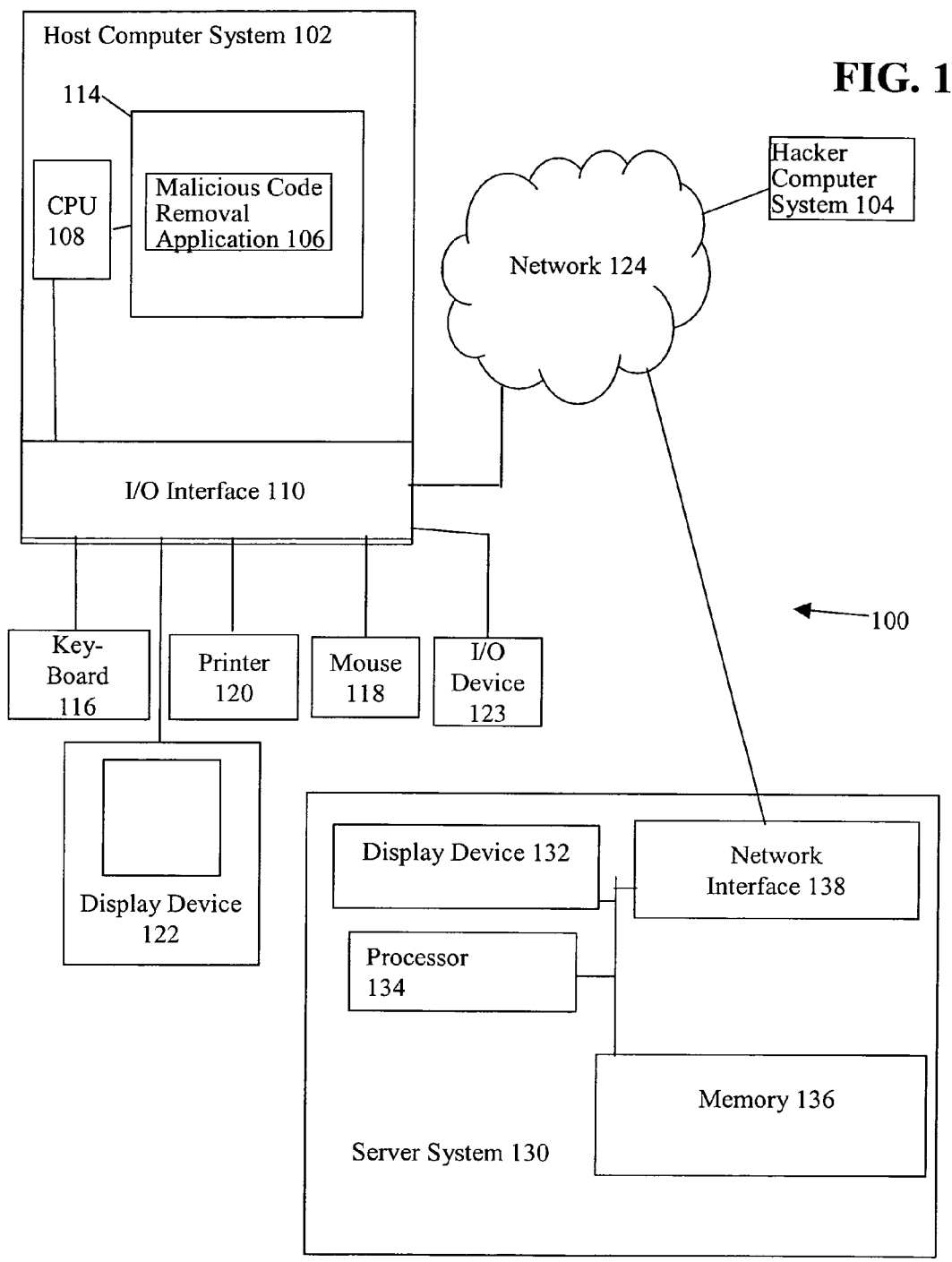
FIG. 1 is a diagram of a client-server system that includes a malicious code removal application executing on a host computer system in accordance with one embodiment of the present invention.

More particularly, FIG. 1 is a diagram of a client-server system 100 that includes a malicious code removal application 106 executing on a host computer system 102 in accordance with one embodiment of the present invention.

Host computer system 102, sometimes called a client or user device, typically includes a central processing unit (CPU) 108, sometimes called a processor 108, an input/output (I/O) interface 110, and a memory 114. Host computer system 102 further includes standard devices like a keyboard 116, a mouse 118, a printer 120, and a display device 122, as well as one or more standard input/output (I/O) devices 123, such as a compact disk (CD) or DVD drive, floppy disk drive, or other digital or waveform ports for inputting data to and outputting data from host computer system 102.

In one embodiment, malicious code removal application 106 is loaded into host computer system 102 via I/O device 123, such as from a CD, DVD, or floppy disk containing malicious code removal application 106.

Host computer system 102 is coupled to a server system 130 of computer system 100 by a network 124. Server system 130 typically includes a display device 132, a processor 134, a memory 136, and a network interface 138. Additional computer systems such as a hacker, e.g., a second, computer system 104 are also associated with network 124.

Network 124 can be any network or network system that is of interest to a user. In various embodiments, network interface 138 and I/O interface 110 include analog modems, digital modems, or a network interface card.

Malicious code removal application 106 is stored, for example, in memory 114 of host computer system 102 and executed on host computer system 102.

The particular type of and configuration of host computer system 102, server system 130, and hacker computer system 104 are not essential to this embodiment of the present invention.

Herein, in one embodiment, malicious code is defined as any computer program, module, set of modules, or code that enters a computer system environment without an authorized user's knowledge and/or without an authorized user's consent. A computer virus is one example of a malicious code. For example, the malicious code is propagated from hacker computer system 104 to host computer system 102.

Some malicious codes, sometimes called rootkits, prevent other applications, such as user mode antivirus (AV) applications, from accessing selected objects, such as files, by overriding selected user mode and/or kernel mode API functions that allow iteration of files or subdirectories in a directory, effectively locking the affected files or subdirectories. Thus, an AV application attempting to iterate the files or subdirectories, is prevented from enumerating the files or subdirectories, thereby preventing malicious code detection and deletion by the AV application.

Figure 2:
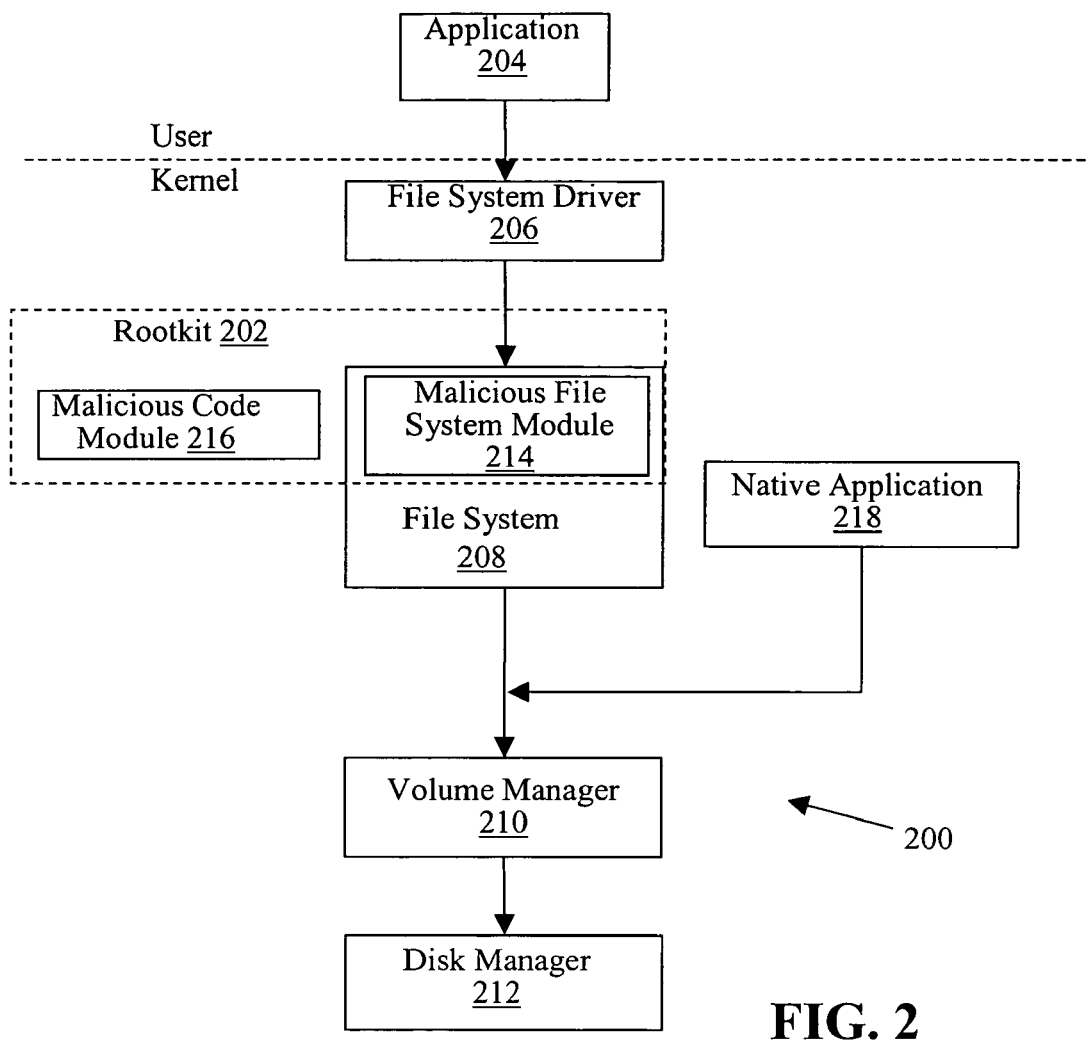
FIG. 2 is a block diagram of a computer system structure illustrating the removal of a rootkit in accordance with one embodiment of the present invention.

FIG. 2 is a block diagram of a computer system structure 200 illustrating the removal of a rootkit 202 in accordance with one embodiment of the present invention. Referring now to FIG. 2, computer system structure 200 includes an application 204, a file system driver 206, a file system 208, a volume manager 210 and a disk manager 212.

Application 204 is a user mode application, for example, is an AV application. To access files and other data, application 204 originates a system call to file system driver 206, for example, using an application programming interface (API). File system driver 206, e.g., a kernel mode component, is a driver for file system 208. File system driver 206 receives the system call from application 204 and translates the system call into a specific command for file system 208.

File system 208 is the system that the operating system uses to organize and keep track of files. In one embodiment, a file is a collection of data that has a file name.

File system 208, in turn, uses volume manager 210 to access volumes in which the files are located. Volume manager 210 manages the volumes of the host computer system. In one embodiment, a volume is a fixed amount of storage medium, e.g., a particular number of bytes of a hard drive, sometimes called disk, of the host computer system. For example, a single hard drive is partitioned into volumes although a volume can span more than one hard drive.

Volume manager 210, in turn, uses disk manager 212 to access the disk in which the volume containing the files are located. Disk manager 212 manages the hard disk, e.g., facilitates read/write to specific bits of the hard disk.

Rootkit 202 includes a malicious file system module 214, e.g., a driver loaded in memory, and a malicious code module 216, e.g., a file on disk. Illustratively, rootkit 202 is in the same volume of the host computer system as the operating system.

In one example, upon booting of the computer system, malicious code module 216 is executed, e.g., due to an entry in the registry, to create malicious file system module 214 within file system 208. For example, the file name of malicious code module 216 is included in the list of files to be executed during booting of the computer system. Malicious file system module 214 has hijacked, sometimes called infected or hooked, file system 208 to protect, sometimes called stealth, rootkit 202.

For example, malicious file system module 214 prevents other applications, such as user mode antivirus (AV) applications, e.g., application 204, from accessing rootkit 202 by overriding selected user mode and/or kernel mode API functions that allow iteration of files or subdirectories in a directory, effectively locking the affected files or subdirectories. Although one example of a rootkit 202 is set forth for purposes of illustration, rootkits are well-known to those of skill in the art and any one of the number of rootkits, e.g., user mode or kernel mode rootkits, can be disabled in accordance with embodiments of the present invention.

FIG. 3 is a flow diagram of a malicious code removal process 300 for removing malicious code such as a rootkit in accordance with one embodiment of the present invention. Referring now to FIGS. 1, 2, and 3 together, in one embodiment, execution of malicious code removal application 106 by processor 108 results in the operations of malicious code removal process 300 as described below.

From an ENTER OPERATION 302, flow moves to a ROOTKIT DETECTED CHECK OPERATION 304. In ROOTKIT DETECTED CHECK OPERATION 304, a determination is made as to whether a rootkit, i.e., malicious code, is detected. A rootkit can be detected using any one of a number of techniques well-known to those of skill in the art, and the particular technique used to detect a rootkit is not essential to this embodiment of the present invention.

If a rootkit is not detected, flow remains at ROOTKIT DETECTED CHECK OPERATION 304. Conversely, if a rootkit is detected, flow moves from ROOTKIT DETECTED CHECK OPERATION 304 to a REBOOT HOST COMPUTER SYSTEM OPERATION 306. For example, rootkit 202 is detected and flow moves from ROOTKIT DETECTED CHECK OPERATION 304 to REBOOT HOST COMPUTER SYSTEM OPERATION 306.

In REBOOT HOST COMPUTER SYSTEM OPERATION 306, the host computer system, e.g., host computer system 102, is rebooted, i.e., restarted. Illustratively, a reboot API is called to reboot the host computer system. During rebooting, the host computer system is shut down and then a boot process is initiated.

From REBOOT HOST COMPUTER SYSTEM OPERATION 306, flow moves to an INTERRUPT BOOT PROCESS OPERATION 308. In INTERRUPT BOOT PROCESS OPERATION 308, the boot process of the host computer system initiated during REBOOT HOST COMPUTER SYSTEM OPERATION 306 is interrupted. As is well-known to those of skill in the art, the boot process is the starting-up of a host computer system, which involves loading the operating system and other basic software. In one embodiment, the boot process is interrupted to prevent execution of malicious code module 216, which otherwise would be executed during booting of the host computer system. By preventing execution of malicious code module 216, creation of malicious file system module 214 is prevented.

In one embodiment, a native application, e.g., a module of malicious code removal application 106, is used to interrupt the boot process. A native application is an application designed to run in the computer environment (machine language and OS) being referenced, i.e., is written to a specific set of software platform APIs and a specific microprocessor. As such, a native application can be created early in the boot process and interrupts the boot process once created. A native application uses the operating system but is launched early in the boot process, for example, before most drivers are loaded.

For example, a native application 218, e.g., a windows native application, is created early in the boot process and prior to execution of malicious code module 216. Native application 218 prevents execution of malicious code module 216 and thus prevents creation of malicious file system module 214 in accordance with this example. In another example, malicious code module 216 is executed and malicious file system module 214 is created. Native applications are well known to those of skill in the art and, for example, are described in "Inside Native Applications", by Mark Russinovich, 3 pages, 1998, which is herein incorporated by reference in its entirety.

From INTERRUPT BOOT PROCESS OPERATION 308, flow moves to a GAIN ACCESS TO THE MEDIA OPERATION 310. In GAIN ACCESS TO THE MEDIA OPERATION 310, access to the media, e.g., volume or disk, containing the rootkit is gained. In various embodiments, the access is: (1) exclusive, e.g., exclusive read and write; (2) shared, e.g., shared read and write; or (3) partially shared and partially exclusive, e.g., shared read and exclusive write. In one embodiment, access to the volume and/or disk is gained by obtaining a handle to the volume and/or disk.

In another embodiment, exclusive access to the volume is gained by unmounting or locking the volume. In one embodiment, the volume is unmounted by making the volume inaccessible, e.g., the volume cannot be referenced, except to the native application, for example, native application 218. Stated another way, the volume is unmounted by making the volume exclusively accessible to the native application.

In another embodiment, the volume is locked by making the volume inaccessible except to the native application, for example, native application 218. For example, the volume can be referenced, however, the volume is locked such that only the native application has access to the volume. Stated another way, the volume is locked by making the volume exclusively accessible to the native application.

By unmounting or locking the volume, conflicts or other complications arising from access of the volume by applications other than the native application or by the operating system are avoided.

From GAIN ACCESS TO THE MEDIA OPERATION 310, flow moves to a DIRECTLY ACCESS THE MEDIA OPERATION 312. In DIRECTLY ACCESS THE MEDIA OPERATION 312, the media, e.g., volume or disk, is directly accessed, e.g., by the native application. For example, native application 218 uses volume manager 210, which uses disk manager 212 (or uses disk manager 212 directly) to directly access the volume or disk. The media is directly accessed to allow direct use, e.g., reading from and writing to, of the media. More particularly, directly accessing the media means to access the media without use of, i.e., bypassing, file system 208 and/or the operating system in one embodiment.

From DIRECTLY ACCESS THE MEDIA OPERATION 312, flow moves to a DISABLE ROOTKIT OPERATION 314. In DISABLE ROOTKIT OPERATION 314, the malicious code, e.g., rootkit 202, is disabled.

In one embodiment, the malicious code, e.g. malicious code module 216, is deleted, sometimes called removed, from the media. In another embodiment, the malicious code, e.g., malicious code module 216, is renamed. In either event, the media is directly accessed, e.g., by the native application, to delete or rename the malicious code.

As discussed above, in one embodiment, the malicious code is in a file and the file has a filename. In DISABLE ROOTKIT OPERATION 314, the filename of the file containing the malicious code is changed, sometimes called renamed.

By renaming the malicious code, the malicious code will not be executed on subsequent booting of the host computer system (or during the present boot process). As discussed above, the filename of the file containing the malicious code is listed for execution during booting of the host computer system. By renaming the file containing the malicious code, the original filename for the file containing the malicious code is disassociated with the file containing the malicious code, i.e., the new filename is associated with the file containing malicious code. Accordingly, when the original filename is retrieved for execution, there is no associated file for execution due to the renaming, and the malicious code is not executed. However, the malicious code still remains on the host computer system, although under a different filename.

From DISABLE ROOTKIT OPERATION 314, flow moves to a REBOOT HOST COMPUTER SYSTEM OPERATION 316. In REBOOT HOST COMPUTER SYSTEM OPERATION 316, the host computer system is rebooted a second time in a manner similar to that discussed above with regards to REBOOT HOST COMPUTER SYSTEM OPERATION 306, and so is not repeated here. However, in one embodiment, in REBOOT HOST COMPUTER SYSTEM OPERATION 316, the host computer system boot process, which was interrupted in INTERRUPT BOOT PROCESS OPERATION 308, is resumed and the host computer system is not rebooted from the beginning.

During the rebooting of the host computer system, in one embodiment, the malicious code is not executed as the malicious code has been removed in DISABLE ROOTKIT OPERATION 314.

In another embodiment, as discussed above, malicious code module 216 is renamed during DISABLE ROOTKIT OPERATION 314. In accordance with this embodiment, the original filename of malicious code module 216 is retrieved for execution. However because malicious code module 216 has a new filename, i.e., has been renamed, malicious cold module 216 is not executed and thus malicious file system module 214 is not created. In this manner, the ability of rootkit 202 to hide itself, e.g., from application 204, is defeated.

From REBOOT HOST COMPUTER SYSTEM OPERATION 316, flow moves, optionally, to a CLEAN HOST COMPUTER SYSTEM OPERATION 318 (or directly to an EXIT OPERATION 320 or returns to ROOTKIT DETECTED CHECK OPERATION 304 if CLEAN HOST COMPUTER SYSTEM OPERATION 318 is not performed). In CLEAN HOST COMPUTER SYSTEM OPERATION 318, the host computer system is cleaned of malicious code. Illustratively, the host computer system is scanned by an antivirus application, e.g., application 204, using any one of a number of techniques well known to those of skill in the art and any malicious code located is deleted or disabled. For example, malicious code module 216, which his been renamed, and any associated registry entries are located and deleted.

As discussed above, in one embodiment, the malicious code is removed during DISABLE ROOTKIT OPERATION 314. In accordance with this embodiment, CLEAN HOST COMPUTER SYSTEM OPERATION 318 is unnecessary, and in one embodiment, is not performed so is an optional operation.

From CLEAN HOST COMPUTER SYSTEM OPERATION 318 (or from REBOOT HOST COMPUTER SYSTEM OPERATION 316 if CLEAN HOST COMPUTER SYSTEM OPERATION 318 is not performed), flow moves to and exits at an EXIT OPERATION 320 or returns to ROOTKIT DETECTED CHECK OPERATION 304 and awaits detection of the next rootkit.

As set forth above, upon detection of a rootkit, the rootkit is removed without a clean boot, i.e., without use of a separate clean boot media such as a floppy disk, CD, DVD, or other media. Further, the rootkit is removed without reconfiguration of the BIOS of the host computer system.

Referring again to FIG. 1, although malicious code removal application 106 is referred to as an application, this is illustrative only. Malicious code removal application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention is carried out using any suitable hardware configuration or means involving a personal computer, a workstation, a portable device, or a network of computer devices. Other network configurations other than client-server configurations, e.g., peer-to-peer, web-based, intranet, and internet network configurations, are used in other embodiments.

Herein, a computer program product comprises a non-transitory medium configured to store computer readable code in accordance with an embodiment of the present invention. Some examples of non-transitory computer program products are CD-ROM discs, DVDs, ROM cards, floppy discs, magnetic tapes, computer hard drives, and servers on a network.

As illustrated in FIG. 1, this medium belongs to the computer system itself. However, the medium is also removed from the computer system. For example, malicious code removal application 106 is stored in memory that is physically located in a location different from processor 108, e.g., memory 136 of server system 130. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that execute malicious code removal application 106 in accordance with at least one of the embodiments as described herein. Similarly, in another embodiment, host computer system 102 and/or server system 130 is comprised of multiple different computers, wireless devices, cellular telephones, digital telephones, two-way pagers, personal digital assistants, server computers, or any desired combination of these devices that are interconnected to perform the methods as described herein.

In view of this disclosure, malicious code removal application 106 in accordance with one embodiment of the present invention can be implemented in a wide variety of computer system configurations. In addition, malicious code removal application 106 could be stored as different modules in memories of different devices. For example, malicious code removal application 106 could initially be stored in server system 130, and as necessary, a portion of malicious code removal application 106 could be transferred to host computer system 102 and executed on host computer system 102. Consequently, part of the malicious code removal functionality would be executed on processor 134 of server system 130, and another part would be executed on processor 108 of host computer system 102. In view of this disclosure, those of skill in the art can implement various embodiments of the present invention in a wide variety of physical hardware configurations using an operating system and computer programming language of interest to the user.

In yet another embodiment, malicious code removal application 106 is stored in memory 136 of server system 130. Malicious code removal application 106 is transferred over network 124 to memory 114 in host computer system 102. In this embodiment, network interface 138 and I/O interface 110 would include analog modems, digital modems, or a network interface card. If modems are used, network 124 includes a communications network, and malicious code removal application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer-program product comprising a non-transitory computer readable medium containing computer program code comprising:
   a malicious code removal application for determining whether malicious code is detected on a host computer system;
   said malicious code removal application for rebooting automatically the host computer system upon the determining finding that malicious code was detected on the host computer system;
   a malicious code removal application for interrupting the rebooting process of the host computer system by a native application in the malicious code removal application;
   said malicious code removal application further for gaining access to a media comprising the malicious code during said interrupted boot process;
   said malicious code removal application further for directly accessing said media during said interrupted boot process by bypassing a file system and operating system of the host computer system; and
   said malicious code removal application further for disabling said malicious code on the media during the directly accessing and during said interrupted boot process.

2. The computer-program product of claim 1 wherein said media is selected from the group consisting of a volume and a disk.

3. The computer-program product of claim 1 wherein said access to said media is exclusive access.

4. The computer-program product of claim 1 wherein said malicious code removal application is further for rebooting said host computer system a second time after said disabling said malicious code.

5. The computer-program product of claim 4 wherein said host computer system is cleaned of said malicious code after said rebooting said host computer system a second time.

6. The computer-program product of claim 1 wherein an operating system of said host computer system is located within said media.

7. The computer-program product of claim 1 wherein said malicious code comprises a rootkit that has hooked a file system of said host computer system to prevent use of said file system to remove said malicious code.

8. The computer-program product of claim 1 wherein said interrupting a boot process of a host computer system comprises preventing execution of a malicious code module of said malicious code.

9. The computer-program product of claim 1 wherein said interrupting a boot process of a host computer system comprises preventing creation of a malicious file system module of said malicious code.

10. The computer-program product of claim 1 wherein said media is a volume, said gaining access to a media comprising malicious code comprising making said volume exclusively accessible by said native application.

11. The computer-program product of claim 1 wherein said directly accessing said media comprises directly accessing said media with said native application.

12. The computer-program product of claim 1 wherein said disabling said malicious code comprises removing said malicious code from said media.

13. The computer-program product of claim 1 wherein said disabling said malicious code comprises renaming a malicious code module of said malicious code.

14. The computer-program product of claim 13 wherein said malicious code removal application is further for rebooting said host computer system, said renamed malicious code module not being executed during said rebooting said host computer system, said malicious code being removed.

15. A computer system comprising:
- a memory having stored therein a malicious code removal application; and
- a processor coupled to said memory, wherein execution of said malicious code removal application generates a method comprising:
  - determining whether malicious code is detected on a host computer system;
  - rebooting automatically the host computer system upon the determining finding that malicious code was detected on the host computer system;
  - interrupting the rebooting process of the host computer system by a native application in the malicious code application;
  - gaining access to a media comprising malicious code during said interrupted boot process;
  - directly accessing said media during said interrupted boot process by bypassing a file system and operating system of the host computer system; and
  - disabling said malicious code on the media during the directly accessing and during said interrupted boot process.

16. A computer-implemented method comprising:
executing, on a processor, a malicious code removal application, the executing comprising:
- determining whether malicious code is detected on a host computer system;
- rebooting automatically the host computer system upon the determining finding that malicious code was detected on the host computer system;
- interrupting the rebooting process of the host computer system by a native application in the malicious code removal application;
- gaining access to a media comprising malicious code during said interrupted boot process;
- directly accessing said media during said interrupted boot process by bypassing a file system and operating system of the host computer system; and
- disabling said malicious code on the media during the directly accessing and during said interrupted boot process.

* * * * *